US007911967B2

(12) United States Patent
Saitou et al.

(10) Patent No.: US 7,911,967 B2
(45) Date of Patent: Mar. 22, 2011

(54) CONTROL AND MONITOR SIGNAL TRANSMISSION SYSTEM

(75) Inventors: Yoshitane Saitou, Kyoto (JP); Kenji Nishikido, Osaka (JP)

(73) Assignee: Anywire Corporation, Kyoto (JP)

( * ) Notice: Subject to any disclaimer, the term of this patent is extended or adjusted under 35 U.S.C. 154(b) by 390 days.

(21) Appl. No.: 12/120,450

(22) Filed: May 14, 2008

(65) Prior Publication Data

US 2008/0221707 A1 Sep. 11, 2008

Related U.S. Application Data

(63) Continuation of application No. PCT/JP2006/320605, filed on Oct. 17, 2006.

(30) Foreign Application Priority Data

Nov. 14, 2005 (JP) ................................ 2005-328873

(51) Int. Cl.
*H04J 1/16* (2006.01)

(52) U.S. Cl. .......... 370/252; 370/203; 370/282; 710/58; 710/110; 710/306; 388/804

(58) Field of Classification Search .................... 710/58, 710/61, 105, 106, 107, 108, 109, 110, 305, 710/306, 310; 370/203, 208, 282, 209, 320, 370/335, 342, 441, 479, 252, 254, 400, 401, 370/402, 503, 509, 512; 363/21.02, 21.03, 363/21.04, 17; 375/130, 260, 272, 285, 343, 375/367; 327/35, 29, 36, 37; 700/3, 296
See application file for complete search history.

(56) References Cited

U.S. PATENT DOCUMENTS

| | | | | |
|---|---|---|---|---|
| 1,782,516 | A | 11/1930 | Sneierson et al. | |
| 4,459,022 | A | 7/1984 | Morey | |
| 4,771,440 | A | 9/1988 | Fromm | |
| 4,994,669 | A | 2/1991 | Stern | |
| 6,266,046 | B1 | 7/2001 | Arita | |
| 6,732,217 | B1 * | 5/2004 | Nishikido | 710/306 |

(Continued)

FOREIGN PATENT DOCUMENTS

EP 0810544 12/1997

(Continued)

OTHER PUBLICATIONS

English language Abstract of JP 2003-199178.

(Continued)

*Primary Examiner* — Aung S Moe
*Assistant Examiner* — Abdullah Riyami
(74) *Attorney, Agent, or Firm* — Greenblum & Bernstein, P.L.C.

(57) ABSTRACT

A master station has a master-station transmission circuit that extracts a serial monitor signal so as to convert a control data signal into monitor data by changing a duty ratio of negative and positive voltage-level periods, converting the control signal into a serial pulsing voltage signal, transmitting a monitor data signal that is superimposed on the serial pulsing voltage signal, and detecting the presence or absence of a signal of a current that flows during the negative and positive voltage-level periods. A plurality of slave stations respectively have a slave-station transmission circuit that identifies a duty ratio of the positive and negative voltage-level periods relative to each serial pulsing voltage signal, that extracts a control data signal so as to output the data to a controllable unit of the slave station.

12 Claims, 6 Drawing Sheets

U.S. PATENT DOCUMENTS

| | | | | |
|---|---|---|---|---|
| 7,146,450 | B2 * | 12/2006 | Saitou et al. | 710/306 |
| 7,174,400 | B2 * | 2/2007 | Horowitz et al. | 710/104 |
| 2001/0027503 | A1 * | 10/2001 | Yamato et al. | 710/126 |
| 2003/0123590 | A1 | 7/2003 | Saitou et al. | |

FOREIGN PATENT DOCUMENTS

| | | | |
|---|---|---|---|
| FR | 2575845 | | 7/1986 |
| JP | 45-035562 | B1 | 11/1970 |
| JP | 4-063581 | B2 | 10/1992 |
| JP | 2002-271878 | | 9/2002 |
| JP | 2003-272878 | | 9/2002 |
| JP | 2003-163654 | | 6/2003 |
| JP | 2003-199178 | | 7/2003 |
| JP | 2003-271878 | | 9/2003 |
| JP | 2009-26509 | | 2/2009 |

OTHER PUBLICATIONS

English language Abstract of JP 2002-271878.
English language Abstract of JP 2003-163654.
English language Abstract of JP 45-035562 B1.
English language Abstract of JP 2003-272878.
English language Abstract of JP 2003-271878.
"Flexible Shaft Increases Joystick Durability", Macine Design, Penton Media, Cleveland, OH, US, vol. 63, No. 25, Dec. 12, 1991, p. 70, XP000270164.

* cited by examiner

CONTROL AND MONITOR SIGNAL TRANSMISSION SYSTEM

CROSS-REFERENCE TO RELATED APPLICATIONS

The present application is a continuation of International Application No. PCT/JP2006/320605 filed on Oct. 17, 2006, the disclosure of which is expressly incorporated by reference herein in its entirety. The present application claims priority under 35 U.S.C. §119 of Japanese Application No. 2005-328873, filed on Nov. 14, 2005, the disclosure of which is expressly incorporated by reference herein in its entirety.

BACKGROUND OF THE INVENTION

1. Field of the Invention

The present invention relates to a control and monitor signal transmission system. More specifically, the present invention relates to a control and monitor signal transmission system that transmits a control signal from a controller to a plurality of controllable units via data signal transmission lines that are shared by the plurality of controllable units, wherein a duty ratio of a negative voltage-level period relative to a neutral electric potential of a pulse and a duty ratio of a positive voltage-level period relative to a neutral electric potential of a subsequent pulse thereto are respectively changed according to a value of each data of a control data signal that is connected to the controller, thus providing reliability against noise in communication.

2. Description of Related Art

Securing accuracy of a transmitted signal is one of the most important matters in transmitting a control signal. Another important matter in transmitting a control signal is to reduce the number of transmission lines to perform control signal transmission. Simplifying wiring will reduce wiring space, wiring man-hours, the time required for fabricating an apparatus, and the size of equipment, thereby improving reliability of the equipment and reducing costs.

Patent Documents 1 and 2 disclose examples of a method of reducing the number of electric signal wires in conventional automation and the like. Patent Document 1 describes a method for detecting a control signal in a control and monitor signal transmission system as the presence or absence of a current signal from a sensor to a controller by binarizing transmission of a control signal from a controller to a controllable unit as a predetermined duty cycle ratio. In this instance, the control signal and a monitor signal can be superimposed on a clock signal and therefore a separate electric power line is not required. Consequently, power supply wiring can be simplified. In addition, in this instance, transmission capacity can be doubled since transmission and reception of a signal between the controller and the controllable unit and sensor can be performed bi-directionally and simultaneously.

Patent Document 2 describes a control and monitor signal transmission system having a timing generator in a master station for generating a constant timing signal that synchronizes with a clock signal of a constant cycle, wherein the control and monitor signal transmission system changes a duty cycle ratio of a period of a power supply voltage level of other than the preset power supply voltage value and a period of a subsequent power supply voltage level thereto, relative to a signal value of a control data signal that is transmitted from a controller for each clock cycle under the control of the timing signal, and outputs the control data signal to a data signal transmission line as a serial pulsing voltage signal.

Patent Document 2 also describes a sensor signal reception in which a value of each data of a control data signal is extracted by identifying a duty cycle ratio of a serial pulsing voltage signal for each clock cycle, by a control method using a timing signal; and a slave station input part produces a monitor data signal that is configured of binarized levels of different current signals by timing-signal based control, according to a value of a corresponding sensor, and superimposes the monitor data signal to a predetermined position of the serial pulsing voltage signal, as a data value of the monitor signal. Further, Patent Document 2 describes a control and monitor signal transmission system of the present invention in which a control signal from a controller to a controllable unit is made to be a binarized signal of a predetermined duty cycle ratio; a monitor signal from a sensor to the controller is detected at a rise of power supply voltage based on the presence or absence of a current signal that is generated in contention between the monitor signal and the power supply voltage; and the control signal and the monitor signal are superimposed on a clock signal.

[Patent Document 1] Japanese Patent Laid-open Publication No. 2003-199178

[Patent Document 2] Japanese Patent Laid-open Publication No. 2002-271878

As described above, the methods described in Patent Documents 1 and 2 allow simplification of electric power wiring. Further, the methods allow a fast-speed transmission rate in addition to the simplification of wiring (transmission line), by changing a duty ratio of a signal and performing a signal transmission and reception.

However, when power supply voltage drops, problems occur such as that a signal level also proportionally drops or that threshold voltage is not sufficiently obtained, causing unstable operation and lowering data reliability.

For example, when a battery-operated power supply is used, ambient temperature in a usage environment could affect an electromotive force of the batteries, leading to a considerable drop of output voltage of the power supply. In other words, low ambient temperature decreases battery power output, causing a considerable drop of voltage due to load. Accordingly, it is difficult to maintain a signal level in communication control that uses such a power supply, and a malfunction could occur.

Further, extension of a data signal transmission line is rigidly limited because problems are easily caused, such as a drop of a signal level due to the extension of the data signal transmission line or picking up of noise that is coupled into the data signal transmission line. Meanwhile, there are unavoidable situations in a practical setting, such as that control from a remote location is required in factory premises, that each equipment is scattered throughout remote locations, or that equipment that could interfere with signals is placed in a signal path.

SUMMARY OF THE INVENTION

The present invention is provided to address the above-described problems in conventional configurations. A feature of the present invention is that it provides a highly reliable control and monitor signal transmission system by reducing possibility of malfunctions of the control and monitor signal transmission system due to a drop of power supply voltage or external noise.

Herein, there is disclosed a control and monitor signal transmission system which includes: a single master station connected to a common data signal transmission line and having a master-station transmission circuit, the master-station transmission circuit having a timing signal generator that generates a timing signal; a plurality of slave stations, each of the slave stations being connected to the common data signal transmission line and having a slave-station transmission circuit, the slave-station transmission circuit having a timing signal generator that generates a timing signal; a controller connected to the master station; and a plurality of controllable apparatuses associated with the plurality of slave stations, each of the controllable apparatuses being connected to one of the slave stations and having a controllable unit and a sensor that monitors the controllable unit. In the control and monitor signal transmission system, control data from the controller is transmitted to the controllable units in the controllable apparatuses via the common data signal transmission line, monitor data from the sensors is transmitted to the controller, and the timing signal generator of the master-station transmission circuit generates a predetermined timing signal that synchronizes with a signal of a clock having a predetermined cycle. Under the control of the timing signal, the master-station transmission circuit modifies a duty ratio of a negative voltage-level period relative to a neutral electric potential of a predetermined pulse and a duty ratio of a positive voltage-level period relative to a neutral electric potential of a subsequent pulse in accordance with each data value of a control data signal from the controller for each cycle of the clock so as to convert the control data signal to a serial pulse voltage signal, and outputs the serial pulse voltage signal to the data signal transmission line. Under the control of the timing signal, the master-station transmission circuit detects a monitor data signal superimposed on the serial pulse voltage signal transmitted through the data signal transmission line, and detects a presence or absence of a current signal flowing during the negative voltage-level period relative to the neutral electric potential of the predetermined pulse and a presence or absence of a current signal flowing during the positive voltage-level period relative to the neutral electric potential of the subsequent pulse for each cycle of the clock so as to extract each data value of the serial monitor data signal, and converts the data value of the serial monitor data signal into the monitor data.

Also disclosed is a control and monitor signal transmission system which includes: a single master station connected to a common data signal transmission line and having a master-station transmission circuit, the master-station transmission circuit having a timing signal generator that generates a timing signal; a plurality of slave stations, each of the slave stations being connected to the common data signal transmission line and having a slave-station transmission circuit, the slave-station transmission circuit having a timing signal generator that generates a timing signal; a controller connected to the master station; and a plurality of controllable apparatuses associated with the plurality of slave stations, each of the controllable apparatuses being connected to one of the slave stations and having a controllable unit and a sensor that monitors the controllable unit. In the control and monitor signal transmission system, control data from the controller is transmitted to the controllable units in the controllable apparatuses via the common data signal transmission line, and monitor data from the sensors is transmitted to the controller. Under the control of the timing signal of the master-station transmission circuit or the slave-station transmission circuit, the slave-station transmission circuit of each of the slave stations identifies a duty ratio of a negative voltage-level period relative to a neutral electric potential of a predetermined pulse of a serial pulse voltage signal and a duty ratio of a positive voltage-level period relative to a neutral electric potential of a subsequent pulse for each cycle of a clock so as to extract each data value of a control data signal, and outputs a signal corresponding to each of the data values to the corresponding controllable unit. Under the control of the timing signal, the slave-station transmission circuit of each of the slave stations produces a monitor data signal based on a presence or absence of a current signal in accordance with a value of a corresponding sensor, and superimposes the current signal to a position of the negative voltage-level period relative to the neutral electric potential of the predetermined pulse of the serial pulse voltage signal and to a position of the positive voltage-level period relative to the neutral electric potential of the subsequent pulse.

Also disclosed is a control and monitor signal transmission system which includes: a single master station connected to a common data signal transmission line and having a master-station transmission circuit, the master-station transmission circuit having a timing signal generator that generates a timing signal; a plurality of slave stations, each of the slave stations being connected to the common data signal transmission line and having a slave-station transmission circuit, the slave-station transmission circuit having a timing signal generator that generates a timing signal; a controller connected to the master station; and a plurality of controllable apparatuses associated with the plurality of slave stations, each of the controllable apparatuses being connected to one of the slave stations and having a controllable unit and a sensor that monitors the controllable unit. In the control and monitor signal transmission system, control data from the controller is transmitted to the controllable units in the controllable apparatuses via the common data signal transmission line, and monitor data from the sensors is transmitted to the controller, and the timing signal generator of the master-station transmission circuit generates a predetermined timing signal that synchronizes with a signal of a clock having a predetermined cycle. Under the control of the timing signal, the master-station transmission circuit modifies a duty ratio of a positive voltage-level period relative to a neutral electric potential of a predetermined pulse and a duty ratio of a negative voltage-level period relative to a neutral electric potential of a subsequent pulse in accordance with each data value of a control data signal from the controller for each cycle of the clock so as to convert the control data signal to a serial pulse voltage signal, and outputs the serial pulse voltage signal to the data signal transmission line. Under the control of the timing signal, the master-station transmission circuit detects a monitor data signal superimposed on the serial pulse voltage signal transmitted through the data signal transmission line, and detects a presence or absence of a current signal flowing during the positive voltage-level period relative to the neutral electric potential of the predetermined pulse and a presence or absence of a current signal flowing during the negative voltage-level period relative to the neutral electric potential of the subsequent pulse for each cycle of the clock so as to extract each data value of the serial monitor data signal, and converts the data value of the serial monitor data signal into the monitor data.

Also disclosed is a control and monitor signal transmission system which includes: a single master station connected to a common data signal transmission line and having a master-station transmission circuit, the master-station transmission circuit having a timing signal generator that generates a timing signal; a plurality of slave stations, each of the slave stations being connected to the common data signal transmission line and having a slave-station transmission circuit, the slave-station transmission circuit having a timing signal generator that generates a timing signal; a controller connected to the master station; and a plurality of controllable apparatuses associated with the plurality of slave stations, each of the controllable apparatuses being connected to one of the slave stations and having a controllable unit and a sensor that monitors the controllable unit. In the control and monitor signal transmission system, control data from the controller is transmitted to the controllable units in the controllable apparatuses via the common data signal transmission line, and monitor data from the sensors is transmitted to the controller. Under the control of the timing signal of the master-station transmission circuit or the slave-station transmission circuit, the slave-station transmission circuit of each of the slave stations identifies a duty ratio of a positive voltage-level period relative to a neutral electric potential of a predetermined pulse of a serial pulse voltage signal and a duty ratio of a negative voltage-level period relative to a neutral electric potential of a subsequent pulse for each cycle of a clock so as to extract each data value of a control data signal, and outputs a signal corresponding to each of the data value of the slave station to a corresponding controllable unit. Under the control of the timing signal, the slave-station transmission circuit of each of the slave stations produces a monitor data signal based on a presence or absence of a current signal in accordance with a value of the corresponding sensor, and superimposes the current signal to a position of the positive voltage-level period relative to the neutral electric potential of the predetermined pulse of the serial pulse voltage signal and to a position of the negative voltage-level period relative to the neutral electric potential of the subsequent pulse.

One of the master station and the slave station may be provided with one power supply voltage, and utilize a power supply circuit that generates an opposite voltage polarity to the power supply voltage so as to utilize the data signal transmission line as a neutral electric potential and provide a positive power supply and a negative power supply relative to the neutral electric potential.

One of the master station and the slave station may be provided with one power supply voltage and utilize a power supply circuit which divides the power supply voltage; utilizes the data signal transmission line as a neutral electric potential, and provide a positive power supply and a negative power supply relative to the neutral electric potential.

One of the features of the present invention is that it may enable a control and monitor signal transmission system, wherein transmission and reception of a signal is performed by detecting a current during a pulse period of a transmission signal that is transmitted via a common transmission line, thereby improving a noise resistance characteristic so as to stably perform control communication, while the number of wires is minimized.

Another feature of the present invention is that it may require only a rising edge or a falling edge of pulse to be set for a signal-handling base point, and enables noise-resistance signal processing, while allowing the control and monitor signal transmission system to be achieved with a minimum number of wires.

Moreover, a circuit configuration of the present invention allows a noise limit relative to power supply voltage to be doubled.

Furthermore, the circuit configuration can be adopted when the power supply voltage can be set sufficiently high. For example, the circuit configuration can be achieved, while voltage Vp is set to 24V so as to make DB line to be a neutral electric potential of 12V.

The present invention has a configuration in which a plurality of slave stations are connected to a single master station.

In this instance, a method for transmitting an address signal continuously after transmitting a start signal to a signal transmission line allows each slave station to fetch control data at the point where a preset address and the address signal coincide or to transmit monitor data of the slave station. Thereby, the plurality of slave stations are made connectable and operable.

According to the present invention, the master station converts a control signal into a serial pulsing voltage signal so as to output to a data signal transmission line, by respectively changing a duty ratio of a negative voltage-level period relative to a neutral electric potential of a predetermined pulse and a duty ratio of a positive voltage-level period relative to a neutral electric potential of a subsequent pulse thereto.

Under the control of a timing signal, a master-station transmission circuit detects a monitor data signal superimposed on the serial pulsing voltage signal transmitted through the data signal transmission line, and detects the presence or absence of a current signal that flows during a negative voltage-level period relative to the neutral electric potential of the predetermined pulse and the presence or absence of the current signal that flows during a positive voltage-level period relative to a neutral electric potential of a subsequent pulse thereto for each clock cycle of a clock signal so as to extract each data value of the serial monitor data signal, and converts the data value of the monitor data signal into monitor data so as to connect to a controller.

Under the control of the timing signal, the plurality of slave stations respectively identify a duty ratio of a negative voltage-level period relative to a neutral electric potential of a predetermined pulse of the serial pulsing voltage signal and a duty ratio of a positive voltage-level period relative to a neutral electric potential of a subsequent pulse for each clock cycle so as to extract each data value of a control data signal, and output the data corresponding to each data value of a controllable unit of the slave station.

Under the control of the timing signal, a slave-station transmission circuit produces the monitor data signal that is configured based on the presence or absence of the current signal, according to a value of a corresponding sensor, and superimposes the signal as a value of monitor data to a position of a negative voltage-level period relative to a neutral electric potential of a predetermined pulse of the serial pulsing voltage signal and to a position of a positive voltage-level period relative to a neutral electric potential of a subsequent pulse thereto.

As described above, the present invention enables the control and monitor signal transmission system, wherein stable signal transmission is achieved without having problems such as unstable signal level due to fluctuation or a drop of power supply voltage, a malfunction due to a drop of the signal level associated with extension of a data signal transmission line, or a malfunction due to noise that is generated on a transmission path or in the equipment being used.

Further, the present invention allows transmission capability to be at a quadrupled speed compared to that of the conventional technologies.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Embodiments of the present invention are explained in the following, with reference to the above-described drawings.

Figure 1:
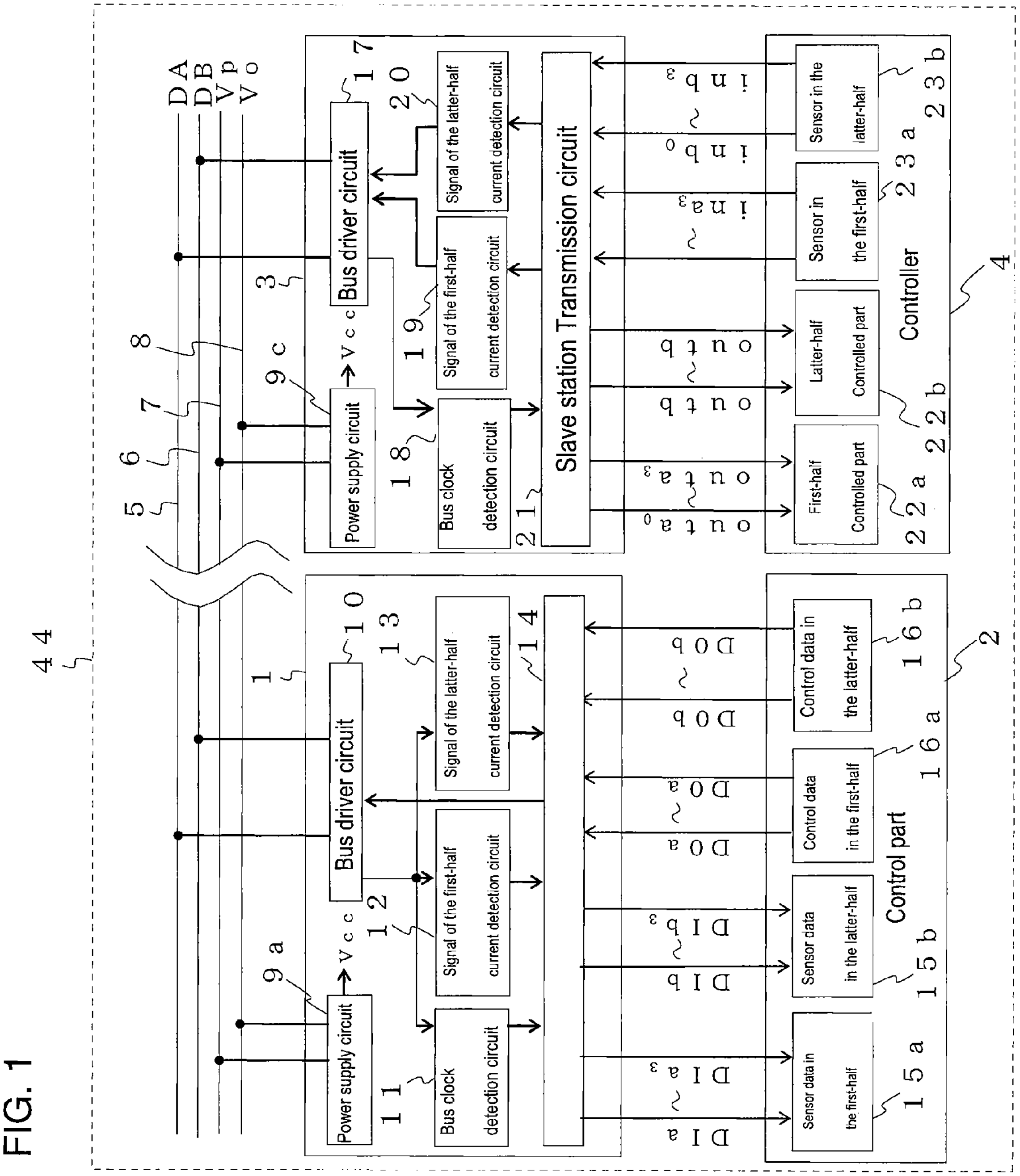
FIG. 1 is a basic schematic diagram illustrating a first embodiment of the present invention in a form of a function block diagram.
Figure 2:
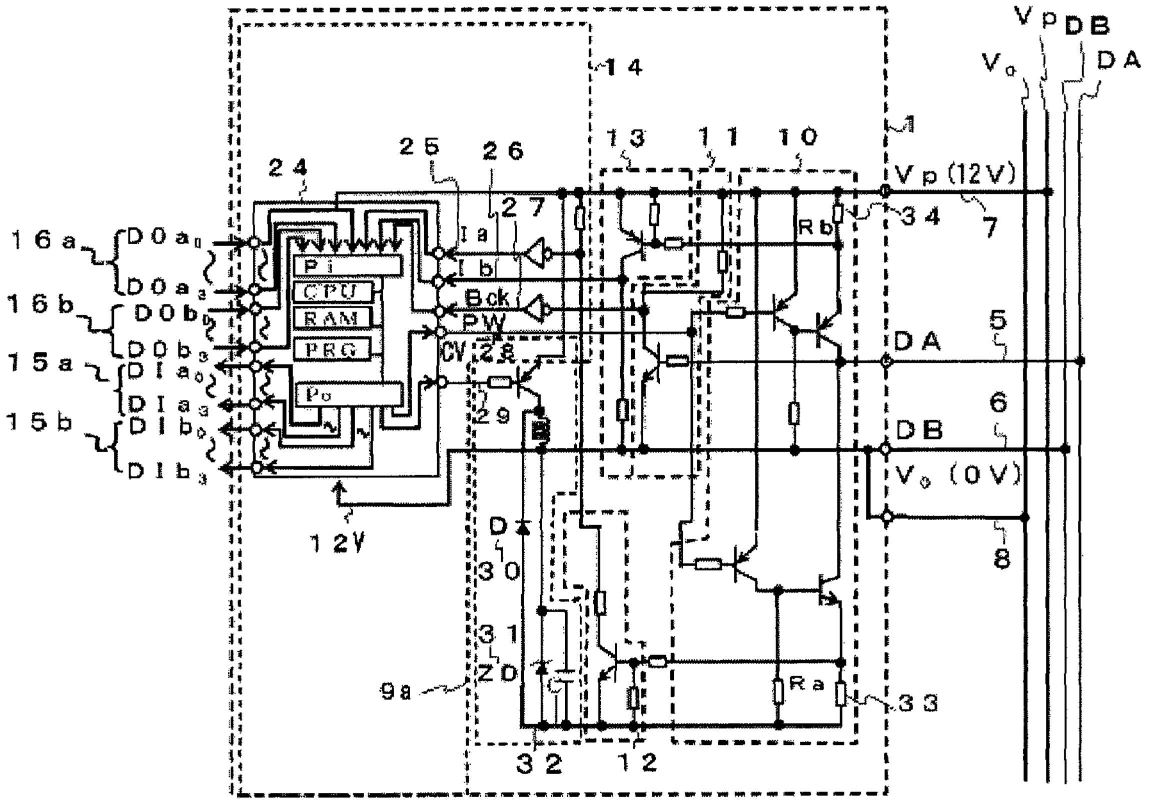
FIG. 2 is a circuit diagram of a master station shown in the basic schematic diagram of the first embodiment in FIG. 1, illustrating a function block of a microcomputer that is a master-station transmission circuit included in the master station.
Figure 3:
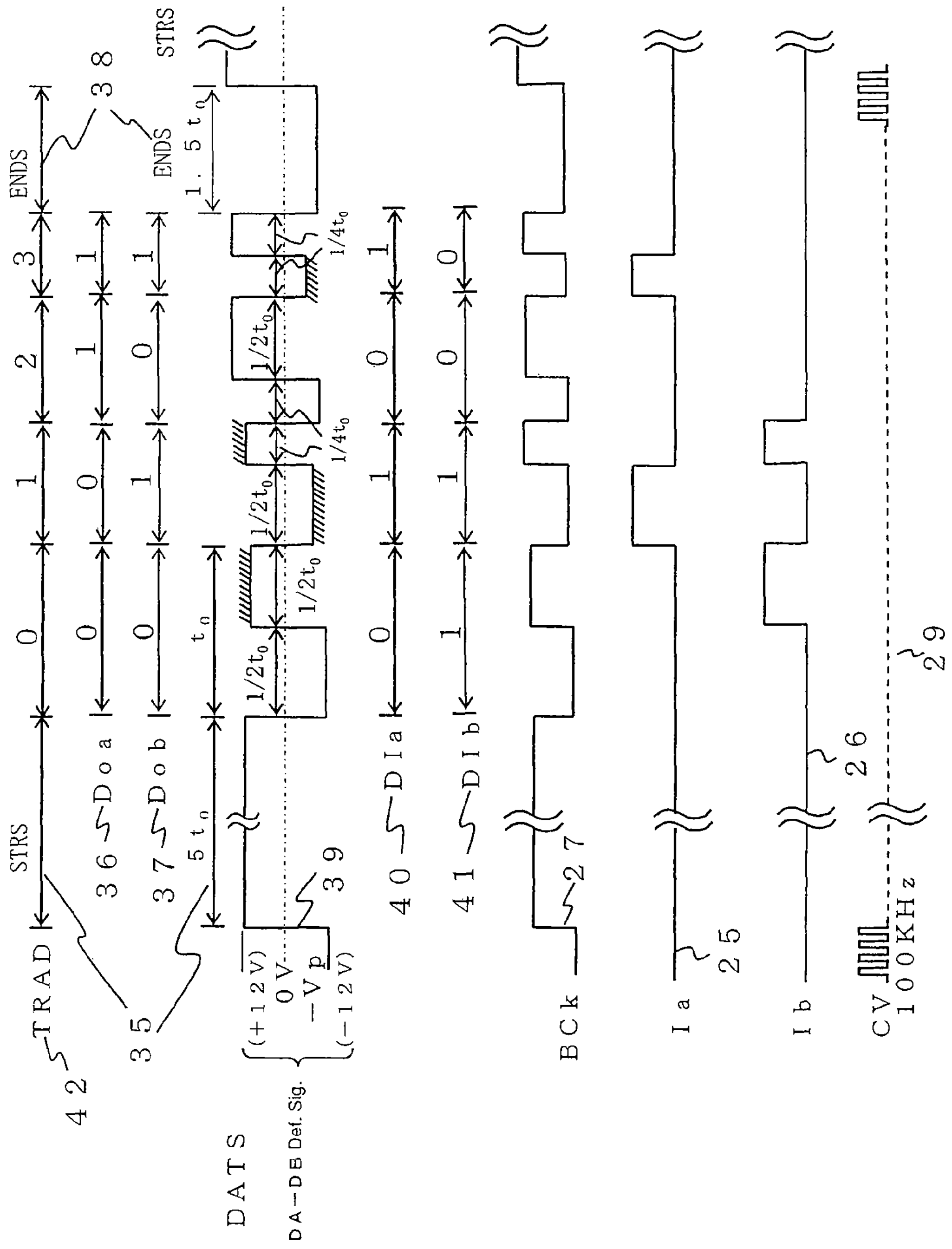
FIG. 3 is a signal transmission diagram of the master station.
Figure 4:
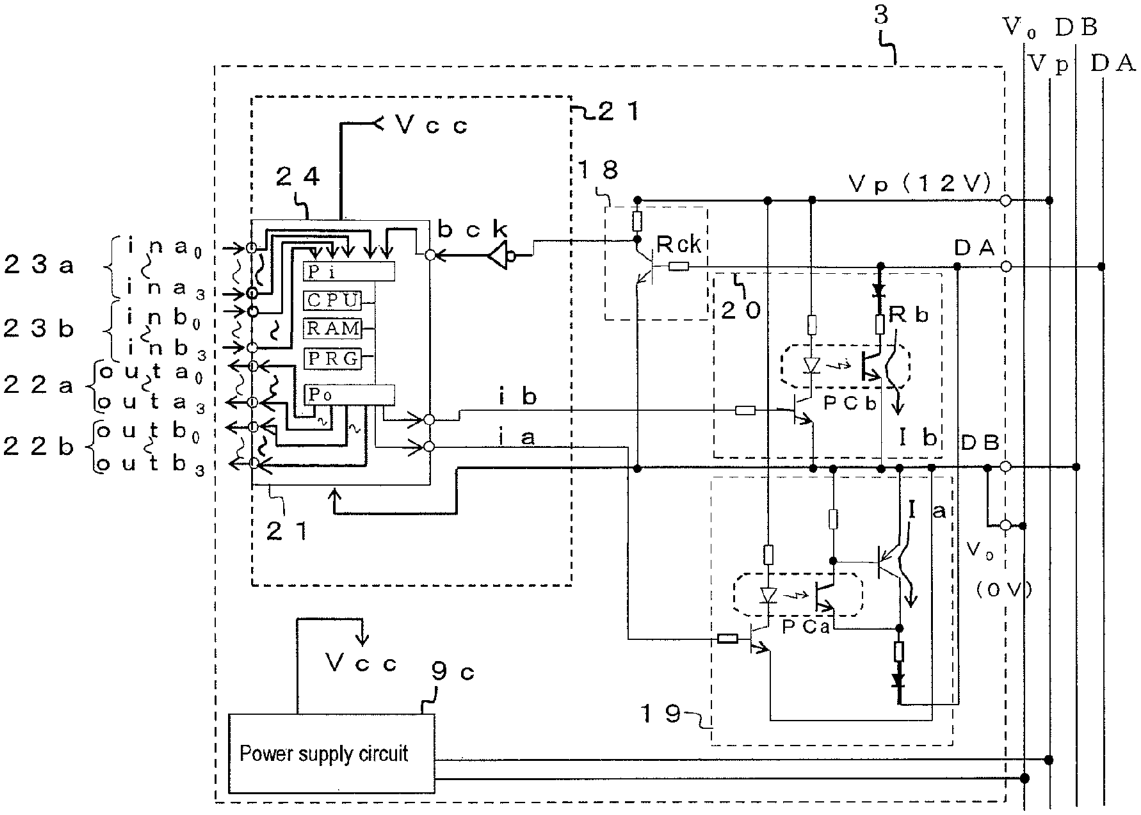
FIG. 4 is a circuit diagram of a slave station in the basic schematic diagram of the first embodiment in FIG. 1, illustrating a function block of a microcomputer that is a slave-station transmission circuit included in the slave station.
Figure 5:
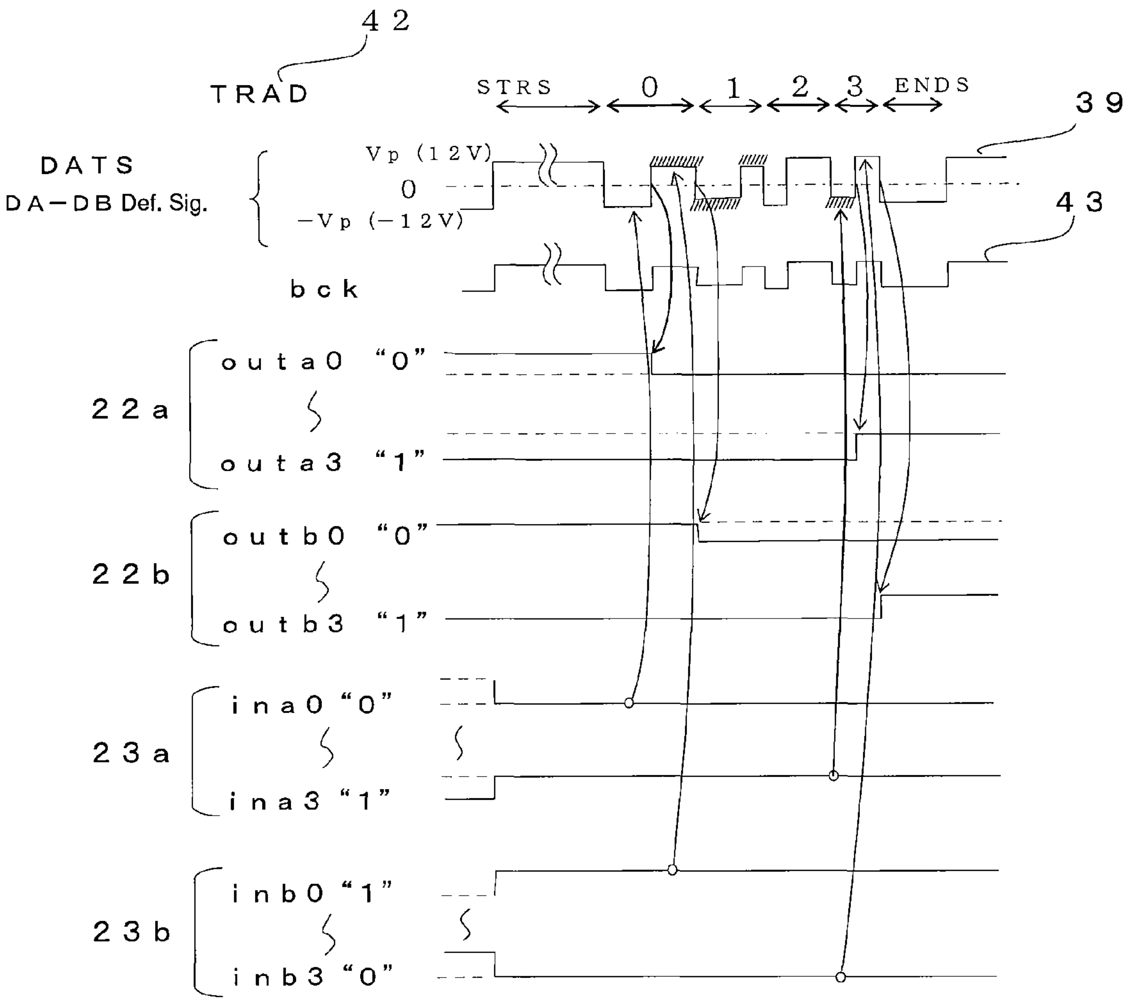
FIG. 5 is a signal transmission diagram of the slave station.

A first embodiment of the present invention is explained with reference to FIGS. 1 to 5. FIG. 1 is an overall configuration of a control and monitor signal transmission system 44 of the present invention. In this embodiment, one slave station 3 is connected to single master station 1. However, a plurality of slave stations 3 are connected in a practical setting. FIG. 2 is a detailed internal configuration of master station 1 shown in FIG. 1. FIG. 3 is a signal transmission diagram that is shown in a time chart format of a signal used inside master station 1. FIG. 4 is a detailed internal configuration of slave station 3 shown in FIG. 1. FIG. 5 is a signal transmission diagram that is shown in a time chart format of a signal used inside slave station 3.

FIGS. 1 to 5 illustrate the first embodiment in detail. Specifically, FIG. 1 illustrates an example in which voltage of power supply line Vp and power supply line Vo is 12 V, and a potential of data signal transmission line DB6 is a neutral electric potential in power supply circuit 9*a* of master station 1. Next, each drawing is described in detail.

In FIG. 1, master station 1 is connected to power supply lines Vp and Vo via power supply circuit 9*a* so as to obtain the power for operating master station 1. Further, master station 1 is connected to common data signal transmission lines DA5 and DB6 via bus driver circuit 10 so as to transmit and receive a signal between master station 1 and slave station 3. Bus-clock detection circuit 11 of master station 1 detects a bus clock from a signal received from common data signal transmission lines 5 and 6 via bus driver circuit 10 so as to pass it to master-station transmission circuit 14 as a bus clock signal.

Moreover, first-half signal current detection circuit 12 and latter-half signal current detection circuit 13 respectively divide a signal current, which is received via bus driver circuit 10, into the first half and the latter half of the data (signal current) and pass the data to master-station transmission circuit 14. Master-station transmission circuit 14 passes each of input data and output data of controller 2 as first-half monitor data 15*a* and latter-half monitor data 15*b*, and as first-half control data 16*a* and latter-half control data 16*b*.

Resistors Ra33 and Rb34 are emitter-connected resistors of an output transistor of bus driver circuit 10 and detect signal voltage that is transmitted to first-half signal current detection circuit 12 and to latter-half signal current detection circuit 13.

FIG. 2 shows a connection from master station 1 to common data signal transmission lines DA and DB, an internal circuit configuration of master station 1, and a data processing function block diagram. Specifically, FIG. 2 is a circuit diagram of a master station in the basic schematic diagram of the first embodiment of the present invention in FIG. 1, illustrating a function block of a microcomputer that is the master-station transmission circuit included in the master station.

Master-station transmission circuit 14 is configured of microcomputer 24 that performs data processing of master station 1 and a connection circuit for the internal wiring of master station 1. Microcomputer 24 is provided with CPU, RAM and a memory device including a program domain that stores logic program PRG such as ROM, so as to center around the CPU. They are respectively connected through an internal bus and are also connected to programmable input interface Pi and programmable output interface Po. Logic program PRG of master station 1 enables data processing of master station 1 of the present invention when being performed on the CPU. The CPU receives signals Ia25, Ib26, and Bck27 that are input from programmable input interface Pi that is an external interface, according to logic program PRG, after being reset when the power is turned on. Then, the CPU outputs the received signals as signal PW from programmable output interface Po to the common data signal transmission line via bus driver circuit 10.

Next, operation of each of the primary functions of master-station transmission circuit 14 is explained.

When the power to the control and monitor signal transmission system 44 of the present invention is turned on, the CPU of master station 1 is reset and starts operating according to logic program PRG that is written in the ROM. The CPU of master station 1 performs a timing signal program for generating a timing signal that forms a foundation of the present invention. The CPU has a data structure of a 4-bit unit so that any microcomputers with a bit width of 4 or more bits can be compatibly used.

In order to retain (store) the condition when the power is turned off, using a state memory, the input and output conditions when the power is turned off need to be written (archived) in a predetermined memory area of a nonvolatile memory (not shown in the drawings) that is provided in master station 1 so as to reproduce (recover) the input and output conditions, when the power is turned on.

There is sufficient time to perform logic program PRG in this embodiment since a clock signal of the CPU is approximately 2 digits faster than the clock signal that is the timing signal of the control and monitor signal transmission system. On the other hand, logic program PRG controls time by using a subroutine program for waiting time or a timer to interrupt, so as to transmit a serial signal to common data signal transmission lines 5 and 6, and obtains the clock signal of ¼t0 that is a basic signal of the timing signal. Master-station transmission circuit 14 only needs to count the basic signal of ¼t0 and to continuously transmit "1" or "0", which indicates a high or low condition, as signal PW from an output port of programmable output interface Po.

In the embodiment shown in FIG. 3, for example, the period of start signal STRS of voltage differential signal DA-DB between data signal transmission lines DA and DB is set to be 5t0. Accordingly, master-station transmission circuit 14 only needs to continuously output "1", which indicates a high condition, as signal PW from an output port of programmable output interface Po for start signal STRS while counting basic signal ¼t0 20 times (a subroutine of basic signal ¼t0 only needs to be performed 20 times). Then, master-station transmission circuit 14 outputs slave station data. The slave station data is shown in the form of a four-cycle pulse signal. The duty (period) of the pulse on the negative side of the four-cycle pulse signal shows the first half 4 bits of the slave station data. The duty of the pulse on the positive side of the four-cycle pulse signal shows the latter half 4 bits of the slave station data.

For example, signals Doa and Dob, which are 8 bit-worth of data of first slave station 3 shown in FIG. 3, are shown in the form of a four-cycle pulse signal. When the negative pulse period is ½t0, the data of the first bit of signal Doa is "0". When the next negative pulse period is also ½t0, the data of the second bit is "0". When the following negative pulse period is ¼t0, the data of the third bit is "1". Further, when the next-following negative pulse period is ¼t0, the data of the fourth bit is "1". Similarly, when the first positive pulse period is ½t0, the data of the first bit of signal Dob is "0". When the next positive pulse period is ¼t0, the data of the second bit is "1". When the following positive pulse period is ½t0, the data of the third bit is "0". Further, when the next-following pulse period on the positive pulse period is ¼t0, the data of the fourth bit is "1".

As described above, signal Doa that is the data of the first half 4 bits of first slave station 3 in FIG. 3 is shown as "0011" and is output while signal Dob that is the data of the latter half 4 bits is shown as "0101".

The shaded areas of the negative and positive pulse periods of data signal DATS, which is voltage differential signal DA-DB, indicate the presence or absence of current signals that are signals Dla and Dlb of first slave station 3. In short, the shaded areas of the negative and positive pulse periods indicate the presence of the current signals. Accordingly, in the master station signal transmission diagram in FIG. 3, signal Dla of first slave station 3 has no current that is detected during the first negative pulse period, based on the condition of voltage differential signal DA-DB. Thus, the first bit is "0". A current is detected during the second negative pulse period succeeding the first pulse period. Thus, the second bit is "1". No current is detected during the third negative pulse period. Thus, the third bit is "0". A current is detected during the fourth negative pulse period. Thus, the fourth bit is "1".

A current is detected during the first positive pulse period of signal Dlb. Thus, the first bit is "1". A current is detected during the second positive pulse period succeeding the first pulse period. Thus, the second bit is "1". No current is detected during the third positive pulse period. Thus, the third bit is "0". No current is detected during the fourth positive pulse period. Thus, the fourth bit is "0".

Four pulses after start signal STRS are the data signal for first slave station 3, and the consecutive four pulses are the data signal for second slave station 3. Slave station 3 can recognize its address by using an 8-bit switch that is not shown in the drawings.

Each slave station 3 only needs to count four pulses as a group and transmit its input signal as the current signal to data signal transmission lines DA and DB while reading a signal of the four corresponding pulses as its own data, after the transmission of a 4-bit data signal immediately before its address.

After transmitting the final slave station signal, master-station transmission circuit 14 outputs "0" condition as end signal ENDS for a period of 1.5t0 from an output port of programmable output interface Po0 in the form of a serial signal. As described above, a subroutine of basic signal ¼t0 only needs to be repeated six times for this time interval. Further, timer IC may be externally attached so as to obtain an accurate timing signal by interrupt control.

In this embodiment, up to 256 slave stations 3 can be provided. Therefore, master-station transmission circuit 14 is provided with an input memory in an 8-bit unit for 256 slave stations 3, as well as an output memory in an 8-bit unit for 256 slave stations 3, so as to constantly retain data of input and output conditions of slave stations 3. Accordingly, master-station transmission circuit 14 transmits an address signal to each slave station 3 and outputs a high or low condition as signal PW from an programmable output port of output interface Po, using a duty ratio of a positive voltage-level period and a negative voltage-level period as a serial signal of ½t0 or ¼t0, according to output memory data of the address. Concurrently, master-station transmission circuit 14 receives from an input port of programmable input interface Pi, the presence or absence of current signal Ia25 that flows during the negative voltage-level period of a pulse and the presence or absence of current signal Ib26 that flows during the positive voltage-level period of a subsequent pulse, as an input signal, during the period of the high or low condition. Then, master-station transmission circuit 14 writes the input signal into an input memory as input data of the slave station address.

As described above, master-station transmission circuit 14 reads the current signals that are consecutively transmitted from slave station 3 while transmitting the signal data that is directed to slave station 3, and finishes communication control so as to consecutively start communication with the next slave station 3.

The signal data for slave station 3 follows an input instruction from controller 2 that is connected to master station 1. Controller 2 and master-station transmission circuit 14 are mutually connected through parallel input and output interfaces, and transmit or receive data so as to correspond to a memory-map. For example, controller 2 includes a sequencer and a host computer system. In this embodiment, when controller 2 is connected, an input and output of a maximum of 256 slave stations 3, which is a total of 16-bit digital input and output (an input and output of slave station 3 are respectively 8 bits), can be reliably performed with four wires.

Monitor data or control data of controller 2 is respectively transmitted and received between controller 2 and microcomputer 24 via programmable input interface Pi or programmable output interface Po. These input and output signals of 8-bit data are divided into the first half 4 bits and the latter half 4 bits for the transmission and reception. In the transmission and reception of the signals to and from slave station 3, first-half signal current detection circuit 12 and latter-half signal current detection circuit 13 respectively detect the signals as signal Ia25 and as signal Ia26 and transfer the signals to microcomputer 24.

Meanwhile, signal PW28 from programmable interface Po of microcomputer 24 is transmitted to common data signal transmission lines 5 and 6 via bus driver circuit 10, as a duty ratio signal of the positive voltage-level period relative to a neutral electric potential of a pulse (i.e. an electric potential of ½ the crest value (or maximum amplitude) of the pulse), or a duty ratio signal in which data signal DATS is in the negative voltage-level period relative to the neutral electric potential of the pulse.

Bus-clock detection circuit 11 detects bus clock signal Bck from common data signal transmission line DA. The detected signal is utilized as a reference signal in a signal transmission and reception between master station 1 and common data signal transmission lines 5 and 6.

In FIG. 1, slave station 3 is connected to master station 1 via common data signal transmission lines DA and DB so as to transmit and receive signal data. Slave-station transmission circuit 21 is connected to controllable apparatus 4 via programmable input interface Pi. In the example shown in FIG. 4, 8-bit data of the sensor of controllable apparatus 4 is divided into the data for first-half sensor 23A (from ina0 to in a3) that is the first half 4-bit signal and the data for latter-half sensor 23*b* (from inb0 to inb3) that is the latter half 4-bit signal, so as to be input. In addition, slave-station transmission circuit 21 is connected through programmable output interface Po of controllable apparatus 4. Eight-bit data of the controllable unit of controllable apparatus 4 is divided into the data for first-half controllable unit 22*a* (from outa0 to outa3) that is the data for first half 4 bits, and the latter-half controllable unit 22*b* (from outb0 to outb3) that is the latter half 4 bits, so as to be output.

Transmission address TRAD signal shown in the master station signal transmission diagram in FIG. 3 uses a group of four pulses as the data signal for one slave station 3. Accordingly, the number of groups of four pulses after start signal STRS forms the data signal of each slave station 3. Thereby, the address signal of slave station 3 can be detected by counting the number of groups of four pulses after start signal STRS.

As start signal STRS indicates, a pulse width as long as 5t0 is maintained in order to identify 5t0 that is five times longer than clock cycle 1t0. Subsequently, after completing the transmission of the signal of a group of four pulses for each slave station 3, the data transmission is completed using end signal ENDS. End signal ENDS has a pulse width of as long as 1.5t0, which is longer than the pulse width t0 of clock signal Bck, so that it can be identified.

Clock signal Bck shows an identical waveform to data signal DATS.

Signal Ia (first-half current detection signal 25) and signal Ib (latter-half current detection signal 26) are received from slave station 3 via common data signal transmission lines DA and DB.

Signal CV is an approximately 100 KHz signal and is a negative voltage power supply that is generated in power supply circuit 9*a* that adopts a converter method. Bus driver circuit 10 transmits a slave station signal to common data signal transmission lines DA and DB using the negative voltage power supply.

FIG. 4 is a circuit diagram of slave station 3. Specifically, FIG. 4 is the circuit diagram of a basic schematic diagram of the slave station of the first embodiment in FIG. 1. FIG. 4 illustrates a function block of a microcomputer that is the slave-station transmission circuit included in the slave station.

Slave station 3 is connected to master station 1 via data signal transmission lines DA and DB, and via power supply lines Vp and Vo. Slave station 3 receives clock signal Bck using slave-station bus-clock detection circuit 18. Slave-station first-half signal current generating circuit 19 is a current generating circuit for a negative electrode side relative to a neutral electric potential. Slave-station latter-half signal current generating circuit 20 is a current generating circuit for a positive electrode side relative to a neutral electric potential.

Microcomputer 24' of slave station 3 forms a core of slave-station transmission circuit 21. Slave-station transmission circuit 21 transmits and receives a signal to and from master station 1 via common data signal transmission lines 5 and 6, and transmits and receives an input and output signals to and from a controlling apparatus.

Slave-station transmission circuit 21 is configured of microcomputer 24' that performs the data processing of slave station 3 and a connection circuit for the internal wiring of slave station 3. A comparison between FIG. 4 and FIG. 1 shows that microcomputer 24' has the similar configuration and functions to microcomputer 24 of master station 1. Accordingly, the CPU of microcomputer 24' should be described as "CPU'" in the drawings. However, "'" is omitted from the drawings for simplicity. Logic program PRG of slave station 3 enables data processing of slave station 3 of the present invention when being performed on the CPU of slave station 3.

Next, operation of each of the functions of slave-station transmission circuit 21 is explained.

Similar to master station 1, when the power to the control and monitor signal transmission system 44 is turned on, the CPU of slave station 3 is reset and starts operating according to logic program PRG of slave station 3 that is written in the ROM of slave station 3. Since the timing signal, which forms the foundation of the present invention, is generated in master station 1, slave station 3 receives the bus clock signal that is detected by slave-station bus-clock detection circuit 18, out of a signal transmitted from master station 1 through data signal transmission lines DA and DB, and utilizes the signal by synchronizing it as the timing signal.

In order to retain (store) the condition when the power is turned off, using a state memory, the input and output conditions when the power is turned off need to be written (archived) in a predetermined memory area of a nonvolatile memory (not shown in the drawings) that is provided in each slave station 3 so as to reproduce (recover) the input and output conditions, when the power is turned on.

Slave station 3 counts transmission address TRAD, which is transmitted following a start signal of the bus clock signal that is a serial signal, as a slave-station data signal that is a group of four pulses. Accordingly, the number of groups of four pulses after the start signal forms the slave-station data signal of each of consecutive slave stations 3. Thereby, slave station 3 can detect its address by counting the number of groups of four pulses after the start signal. Slave station 3 recognizes its address by reading the condition of the address decoding 8-bit switch that is described earlier (not shown in the drawing).

Slave station 3 makes the group of data of its address to be its data signal after counting the groups of pulses. Upon receiving the following data signal DATS, slave station 3 converts the serial data into a parallel data so as to deliver the data of first-half controllable unit 22*a* and the data of latter-half controllable unit 22*b* to memory-mapped I/O.

Meanwhile, slave station 3 writes sensor signals of first-half sensor 23*a* and latter-half sensor 23*b* into an input memory of slave station 3 and makes the parallel data, which is the sensor signals written into the input memory, to be a serial current signal. Furthermore, slave station 3 transmits the serial current signal during a negative period of the first-half and latter-half predetermined pulses or during a positive pulse period. Specifically, according to the high or low condition of a predetermined bus clock signal, slave station 3 transmits the serial current signal to common data signal transmission lines DA and DB for master station 1 via slave-station first-half signal current generating circuit 19 and slave-station latter-half signal current generating circuit 20.

Moreover, slave station 3 transmits to controllable apparatus 4 that is connected thereto, a signal for performing the control operations of controllable apparatus 4. Specifically, slave-station transmission circuit 21 transmits an output signal to first-half controllable unit 22*a* and latter-half controllable unit 22*b*, and then transmits the signal for performing the controllable operations of controllable apparatus 4 that is connected to slave station 3.

Slave-station transmission circuit 21 receives an input signal from first-half sensor 23*a* and latter-half sensor 23*b*. Slave-station transmission circuit 21 temporality stores (retain) input data in its memory area to produce signal ia based upon the input data, and then transmits signal ia as signal current Ia to data signal transmission line DA via slave-station first-half signal current generating circuit 19. In addition, slave-station transmission circuit 21 transmits signal ib as signal current Ib to data signal transmission line DB via slave-station latter-half signal current generating circuit 20.

FIG. 5 is a slave-station signal transmission diagram. Slave station 3 counts four pulses as a group and monitors transmission address TRAD using a start signal as a base point. When detecting the address that is one ahead of its own address during the monitoring, slave station 3 fetches data signal DATS of its own address that subsequently follows and performs signal processing. Data signal DATS of other than its address will be ignored (not fetched).

After slave station 3 detects its address, slave-station transmission circuit 21 transmits data to first-half controllable unit 22*a* and to latter-half controllable unit 22*b*, by transmitting a current during the negative voltage-level period and the positive voltage-level period of a pulses of the data signal of data signal DATS, and fetches data from first-half sensor 23*a* and latter-half sensor 23*b*, using the timing signal of clock signal bck of each slave station 3 as a reference.

Data signal DATS has no current signal transmitted during the negative voltage-level period after start signal STRS. Specifically, "0" condition signal of ina0 port of first-half sensor 23*a* is fetched, preventing a current from flowing during that period. Consequently, "0" signal condition is reflected. On the other hand, "1" condition signal of in a3 port of first-half sensor 23*a* of data signal DATS is fetched, allowing a current signal that reflects "1" signal condition to flow during the negative voltage-level period of the fourth pulse signal. Consequently, "1" signal condition is shown.

Moreover, "1" condition signal of inb0 port of latter-half sensor 23*b* is fetched so as to reflect signal condition "1", allowing a current to flow during the continuous shaded area that is the positive period of the first pulse, as indicated by the arrow showing the relationship. Furthermore, "0" condition signal of inb3 port of latter-half sensor 23*b* is fetched so as to reflect "0" signal condition, preventing a current from flowing during the positive voltage-level period of the fourth pulse signal. Consequently, signal condition "0" is reflected as indicated by the arrow showing the relationship.

Because the negative pulse-signal period of the first pulse of data signal DATS after start signal STRS is ½t0, "0" signal is output to outa0 port of first-half controllable unit 22 at a timing in which the pulse inverts from negative to positive. This is indicated by the arrow showing the relationship. In addition, because the negative pulse period of the fourth pulse is ¼t0, an output of outa3 port rises as "1".

Because the positive pulse-signal period of the first pulse is ½t0, "0" signal is output to outb0 port of latter-half controllable unit 22*b* at a timing in which the pulse inverts from positive to negative. This is indicated by the arrow showing the relationship. In addition, because the positive pulse period of the fourth pulse is ¼t0, an output of out3 port rises as "1". This is indicated by the arrow showing the relationship.

The above-described embodiment adopts but not limited to a non-command method. The embodiment may also adopt what is called a command method that assigns address data to four pulses and that uses the next four pulses as transmission data.

Figure 6:
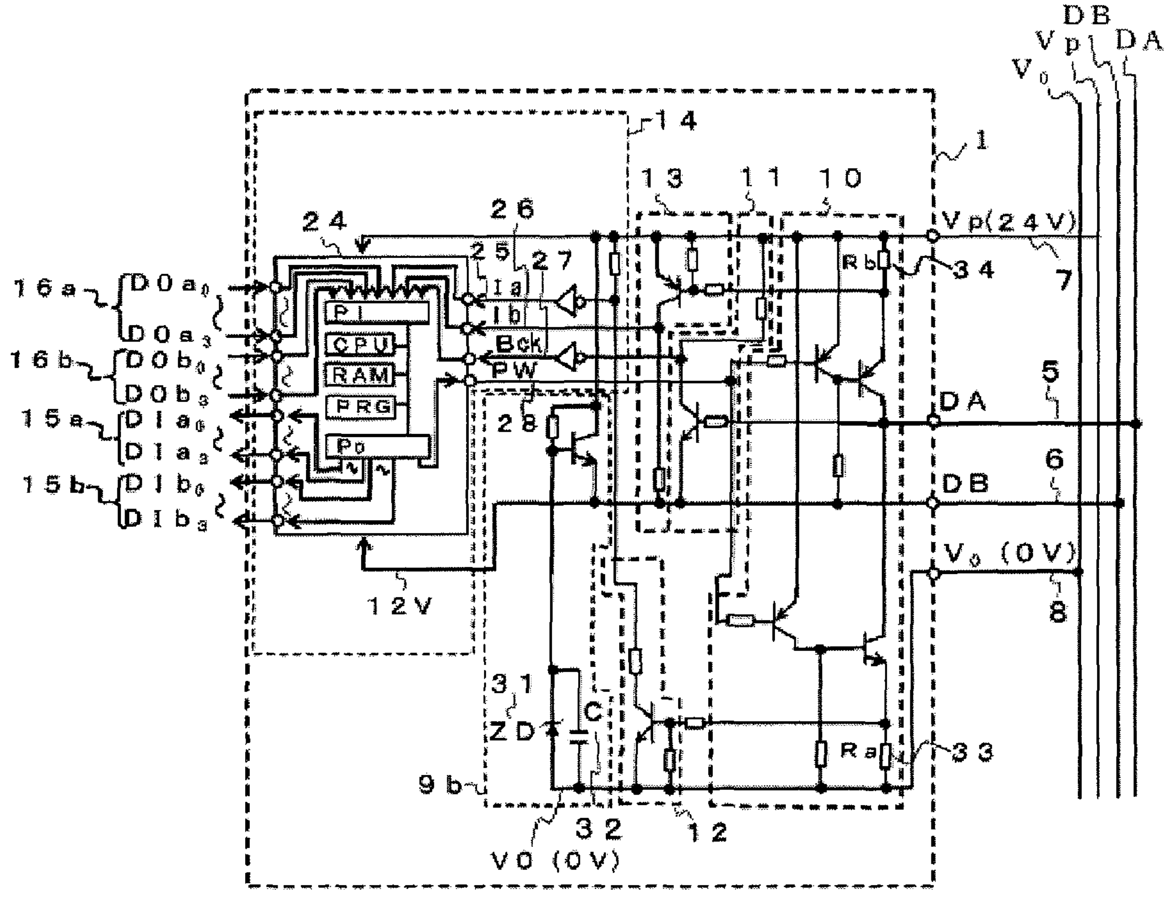
FIG. 6 is a circuit diagram of a master station that is a basic schematic diagram of a second embodiment, illustrating a function block of a microcomputer that is a master-station transmission circuit included in the master station.

FIG. 6 shows an embodiment in which master station 1 uses voltage division. Specifically, FIG. 6 is a basic schematic diagram of a second embodiment showing a circuit diagram of the master station, illustrating a function block, in particular, of a microcomputer that is a master-station transmission circuit included in the master station.

FIG. 6 shows a detailed internal configuration of master station 1 of the second embodiment. Specifically, the voltage of power supply lines Vp 7 and Vo 8 is both 24V while the voltage of power supply lines Vp and Vo is both 12V in FIG. 1. An example in FIG. 6 shows in which power supply circuit 9*b* of master station 1 divides power supply lines Vp 7 and Vo 8, so as to allow data signal transmission line DB6 to be a neutral electric potential at 12V. The configuration except master station 1 is the same as the configuration shown in FIGS. 1 to 5.

Master station 1 is data-connected to slave station 3 through data signal transmission lines DA and DB. The connections to power supply lines Vp and Vo are the same as that of the embodiment shown in FIG. 2. While power supply circuit 9*a* generates −12V relative to 12V power supply Vp in the embodiment shown in FIG. 2, power supply circuit 9*b* divides a voltage of 24V power supply Vp so as to allow common data signal transmission line DB, which is a neutral electric potential, to be 12V, in the embodiment shown in FIG. 6.

Except for the above-mentioned matters, the operation principles of bus driver circuit 10; bus-clock detection circuit 11; first-half signal current detection circuit 12; latter-half signal current detection circuit 13; master-station transmission circuit 14; first-half input data (first-half monitor data) 15*a*; latter-half input data (latter-half monitor data) 15*b*; first-half output data (first-half control data) 16*a*; latter-half output data (latter-half control data) 16*b*; and microcomputer 24 are the same as those of the embodiment shown in FIG. 2. The functions of signal Ia (first-half current detection signal 25); signal Ib (latter-half current detection signal 26); clock signal Bck; and signal PW are the same as those of the example shown in FIG. 2.

In FIG. 6, as described above, voltage of 24V is divided by zener diode ZD (31). Moreover, capacitor C charges the voltage that is divided by zener diode ZD so that the divided voltage is maintained.

The control and monitor signal transmission system of the present invention that transmits a signal between the master station and the remote slave stations so as to perform an accurate control operation can be widely utilized.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A control and monitor signal transmission system, comprising:

a single master station connected to a common data signal transmission line and comprising a master-station transmission circuit, the master-station transmission circuit comprising a timing signal generator that generates a timing signal;

a plurality of slave stations, each of the slave stations being connected to the common data signal transmission line and comprising a slave-station transmission circuit, the slave-station transmission circuit comprising a timing signal generator that generates a timing signal;

a controller connected to the master station; and a plurality of controllable apparatuses associated with the plurality of slave stations, each of the controllable apparatuses being connected to one of the slave stations and comprising a controllable unit and a sensor that monitors the controllable unit, wherein control data from the controller is transmitted to the controllable units of the controllable apparatuses via the common data signal transmission line, and monitor data from the sensors is transmitted to the controller;

the timing signal generator of the master-station transmission circuit generates a predetermined timing signal that synchronizes with a signal of a clock having a predetermined cycle;

under the control of the timing signal, the master-station transmission circuit modifies a duty ratio of a negative voltage-level period relative to a neutral electric potential of a predetermined pulse and a duty ratio of a positive voltage-level period relative to a neutral electric potential of a subsequent pulse in accordance with each data value of a control data signal from the controller for each cycle of the clock so as to convert the control data signal to a serial pulse voltage signal, and outputs the serial pulse voltage signal to the data signal transmission line; and under the control of the timing signal, the master-station transmission circuit detects a monitor data signal superimposed on the serial pulse voltage signal transmitted through the data signal transmission line by detecting a presence or absence of a signal of a current flowing during the negative voltage-level period relative to the neutral electric potential of the predetermined pulse and a presence or absence of a signal of a current flowing during the positive voltage-level period relative to the neutral electric potential of the subsequent pulse for each cycle of the clock so as to extract each data value of the serial monitor data signal, and converts the data value of the serial monitor data signal into the monitor data.

2. A control and monitor signal transmission system, comprising:

a single master station connected to a common data signal transmission line and comprising a master-station transmission circuit, the master-station transmission circuit comprising a timing signal generator that generates a timing signal;

a plurality of slave stations, each of the slave stations being connected to the common data signal transmission line and comprising a slave-station transmission circuit, the slave-station transmission circuit comprising a timing signal generator that generates a timing signal;

a controller connected to the master station; and a plurality of controllable apparatuses associated with the plurality of slave stations, each of the controllable apparatuses being connected to one of the slave stations and comprising a controllable unit and a sensor that monitors the controllable unit, wherein control data from the controller is transmitted to the controllable units of the controllable apparatuses via the common data signal transmission line, and monitor data from the sensors is transmitted to the controller;

under the control of the timing signal of one of the master-station transmission circuit and the slave-station transmission circuit, the slave-station transmission circuit of each of the slave stations identifies a duty ratio of a negative voltage-level period relative to a neutral electric potential of a predetermined pulse of a serial pulse voltage signal and a duty ratio of a positive voltage-level period relative to a neutral electric potential of a subsequent pulse for each cycle of a clock so as to extract each data value of a control data signal, and outputs a signal corresponding to each of the data values of a corresponding slave station to a corresponding controllable unit; and under the control of the timing signal, the slave-station transmission circuit of each of the slave stations produces a monitor data signal based on a presence or absence of a signal of a current in accordance with a value of a corresponding sensor, and superimposes the signal of the current to a position of the negative voltage-level period relative to the neutral electric potential of the predetermined pulse of the serial pulse voltage signal and to a position of the positive voltage-level period relative to the neutral electric potential of the subsequent pulse.

3. A control and monitor signal transmission system, comprising:

a single master station connected to a common data signal transmission line and comprising a master-station transmission circuit, the master-station transmission circuit having a timing signal generator that generates a timing signal;

a plurality of slave stations, each of the slave stations being connected to the common data signal transmission line and comprising a slave-station transmission circuit, the slave-station transmission circuit comprising a timing signal generator that generates a timing signal;

a controller connected to the master station; and a plurality of controllable apparatuses associated with the plurality of slave stations, each of the controllable apparatuses being connected to one of the slave stations and comprising a controllable unit and a sensor that monitors the controllable unit, wherein control data from the controller is transmitted to the controllable units of the controllable apparatuses via the common data signal transmission line, and monitor data from the sensors is transmitted to the controller;

the timing signal generator of the master-station transmission circuit generates a predetermined timing signal that synchronizes with a signal of a clock having a predetermined cycle;

under the control of the timing signal, the master-station transmission circuit modifies a duty ratio of a positive voltage-level period relative to a neutral electric potential of a predetermined pulse and a duty ratio of a negative voltage-level period relative to a neutral electric potential of a subsequent pulse in accordance with each data value of a control data signal from the controller for each cycle of the clock so as to convert the control data signal to a serial pulse voltage signal, and outputs the serial pulse voltage signal to the data signal transmission line; and under the control of the timing signal, the master-station transmission circuit detects a monitor data signal superimposed on the serial pulse voltage signal transmitted through the data signal transmission line by detecting a presence or absence of a signal of a current flowing during the positive voltage-level period relative to the neutral electric potential of the predetermined pulse and a presence or absence of a signal of a current flowing during the negative voltage-level period relative to the neutral electric potential of the subsequent pulse for each cycle of the clock so as to extract each data value of a serial monitor data signal, and converts the data value of the serial monitor data signal into the monitor data.

4. A control and monitor signal transmission system, comprising:

a single master station connected to a common data signal transmission line and comprising a master-station transmission circuit, the master-station transmission circuit comprising a timing signal generator that generates a timing signal;

a plurality of slave stations, each of the slave stations being connected to the common data signal transmission line and comprising a slave-station transmission circuit, the slave-station transmission circuit comprising a timing signal generator that generates a timing signal;

a controller connected to the master station; and a plurality of controllable apparatuses associated with the plurality of slave stations, each of the controllable apparatuses being connected to one of the slave stations and comprising a controllable unit and a sensor that monitors the controllable unit, wherein control data from the controller is transmitted to the controllable units of the controllable apparatuses via the common data signal transmission line, and monitor data from the sensors is transmitted to the controller;

under the control of the timing signal of one of the master-station transmission circuit and the slave-station transmission circuit, the slave-station transmission circuit of each of the slave stations identifies a duty ratio of a positive voltage-level period relative to a neutral electric potential of a predetermined pulse of a serial pulse voltage signal and a duty ratio of a negative voltage-level period relative to a neutral electric potential of a subsequent pulse for each cycle of a clock so as to extract each data value of a control data signal, and outputs a signal corresponding to each of data value of a slave station to a corresponding controllable unit; and under the control of the timing signal, the master-station transmission circuit detects a monitor data signal superimposed on the serial pulse voltage signal transmitted through the data signal transmission line, and detects a presence or absence of a signal of a current flowing during the negative voltage-level period relative to the neutral electric potential of the predetermined pulse and a presence or absence of a signal of a current flowing during the positive voltage-level period relative to the neutral electric potential of the subsequent pulse for each cycle of the clock so as to extract each data value of the serial monitor data signal, and converts the data value of the serial monitor data signal into the monitor data.

5. The control and monitor signal transmission system according to claim 1, wherein one of the master station and the slave station is provided with one power supply voltage, and utilizes a power supply circuit that generates an opposite voltage polarity to the power supply voltage so as to utilize the data signal transmission line as a neutral electric potential and provide a positive power supply and a negative power supply relative to the neutral electric potential.

6. The control and monitor signal transmission system according to claim 1, wherein one of the master station and the slave station is provided with one power supply voltage, and utilizes a power supply circuit which divides the power supply voltage, utilizes the data signal transmission line as a neutral electric potential, and provides a positive power supply and a negative power supply relative to the neutral electric potential.

7. The control and monitor signal transmission system according to claim 2, wherein one of the master station and the slave station is provided with one power supply voltage, and utilizes a power supply circuit that generates an opposite voltage polarity to the power supply voltage so as to utilize the data signal transmission line as a neutral electric potential and provide a positive power supply and a negative power supply relative to the neutral electric potential.

8. The control and monitor signal transmission system according to claim 3, wherein one of the master station and the slave station is provided with one power supply voltage, and utilizes a power supply circuit that generates an opposite voltage polarity to the power supply voltage so as to utilize the data signal transmission line as a neutral electric potential and provide a positive power supply and a negative power supply relative to the neutral electric potential.

9. The control and monitor signal transmission system according to claim 4, wherein one of the master station and the slave station is provided with one power supply voltage, and utilizes a power supply circuit that generates an opposite voltage polarity to the power supply voltage so as to utilize the data signal transmission line as a neutral electric potential and provide a positive power supply and a negative power supply relative to the neutral electric potential.

10. The control and monitor signal transmission system according to claim 2, wherein one of the master station and the slave station is provided with one power supply voltage, and utilizes a power supply circuit which divides the power supply voltage, utilizes the data signal transmission line as a neutral electric potential, and provides a positive power supply and a negative power supply relative to the neutral electric potential.

11. The control and monitor signal transmission system according to claim 3, wherein one of the master station and the slave station is provided with one power supply voltage, and utilizes a power supply circuit which divides the power supply voltage, utilizes the data signal transmission line as a neutral electric potential, and provides a positive power supply and a negative power supply relative to the neutral electric potential.

12. The control and monitor signal transmission system according to claim 4, wherein one of the master station and the slave station is provided with one power supply voltage, and utilizes a power supply circuit which divides the power supply voltage, utilizes the data signal transmission line as a neutral electric potential, and provides a positive power supply and a negative power supply relative to the neutral electric potential.

* * * * *